(12) United States Patent
Mori et al.

(10) Patent No.: US 10,059,590 B2
(45) Date of Patent: Aug. 28, 2018

(54) METHOD FOR PRODUCING GROUP III NITRIDE CRYSTAL

(71) Applicant: Panasonic Intellectual Property Management Co., Ltd., Osaka (JP)

(72) Inventors: Yusuke Mori, Osaka (JP); Mamoru Imade, Osaka (JP); Tomio Yamashita, Osaka (JP); Ryo Kuwabara, Hokkaido (JP); Yoshio Okayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 400 days.

(21) Appl. No.: 14/847,176

(22) Filed: Sep. 8, 2015

(65) Prior Publication Data
US 2016/0090304 A1 Mar. 31, 2016

(30) Foreign Application Priority Data

Sep. 30, 2014 (JP) .................................. 2014-201880
Jun. 29, 2015 (JP) .................................. 2015-130217

(51) Int. Cl.
*C01B 21/06* (2006.01)

(52) U.S. Cl.
CPC ................................ *C01B 21/0632* (2013.01)

(58) Field of Classification Search
None
See application file for complete search history.

(56) References Cited

FOREIGN PATENT DOCUMENTS

| JP | 11-001399 | 1/1999 |
|---|---|---|
| JP | 2006-114845 | 4/2006 |
| JP | 2007-039272 | 2/2007 |
| JP | 2008-024544 | 2/2008 |
| JP | 2008-066490 | 3/2008 |
| JP | 2009-234800 | 10/2009 |
| JP | 2013-060340 | 4/2013 |

*Primary Examiner* — Guinever S Gregorio
(74) *Attorney, Agent, or Firm* — Panasonic IP Management

(57) ABSTRACT

A method and apparatus for producing a Group III nitride in which the thermal decomposition of the nitrogen element-containing gas is suppressed to enhance the productivity. The method for producing a Group III nitride crystal, comprising: reacting an oxide or a metal of a Group III element under a heated atmosphere to form a compound gas of the Group III element; mixing a nitrogen element-containing gas at a temperature that is lower than that of the compound gas, with the compound gas; and reacting the nitrogen element-containing gas with the compound gas to form a Group III nitride crystal.

11 Claims, 2 Drawing Sheets

METHOD FOR PRODUCING GROUP III NITRIDE CRYSTAL

BACKGROUND

1. Technical Field

The present disclosure relates to a method for producing a Group III nitride crystal, and an apparatus for producing the same.

2. Description of Related Art

A Group III nitride crystal has been utilized in a heterojunction high energy electron device, such as a field of a power semiconductor, and a photoelectronic device, such as an LED and a field of laser. As a production method of a Group III nitride crystal, an oxide vapor phase epitaxy method using a Group III oxide as a raw material has been developed (see, for example, JP-A-2009-234800).

The reaction system in the oxide vapor phase epitaxy method is as shown below. $Ga_2O_3$ is heated, and hydrogen gas is introduced thereto. The hydrogen gas ($H_2$) thus introduced is reacted with $Ga_2O_3$ to form $Ga_2O$ gas (the following reaction scheme (I)). Ammonia gas is then introduced thereto and reacted with $Ga_2O$ gas thus formed, thereby forming a GaN crystal on a seed substrate (the following reaction scheme (II)).

$$Ga_2O_3 + 2H_2 \rightarrow Ga_2O + 2H_2O \quad (I)$$

$$Ga_2O + 2NH_3 \rightarrow 2GaN + H_2O + 2H_2 \quad (II)$$

However, there have been cases where a nitrogen element-containing gas, such as ammonia gas, is thermally decomposed in the process of introducing. In these cases, a shortage of ammonia as a nitrogen element-containing gas may occur due to the thermal decomposition in the reaction scheme (II), and the amount of GaN as a Group III nitride crystal formed may be decreased, which results in the deterioration in productivity.

SUMMARY

One of the objects of the disclosure is to provide a method and an apparatus for producing a Group III nitride crystal that are capable of enhancing the productivity.

For achieving the above and other objects, the disclosure relates to as one aspect thereof an apparatus for producing a Group III nitride crystal, containing:

a chamber;

a nitrogen element-containing gas introducing tube for introducing a nitrogen element-containing gas to the chamber;

a holder for holding an oxide or a metal of a Group III element;

a first heater for heating the holder;

a reactive gas introducing tube for supplying a reactive gas to the oxide or the metal of the Group III element;

a compound gas supplying port for supplying a compound gas of the Group III element formed through reaction of the reactive gas, to the chamber;

a discharging port for discharging the compound gas and the nitrogen element-containing gas outside the chamber; and a second heater for heating a seed substrate inside the chamber, a distance between the holder and the first heater being smaller than a distance between the nitrogen element-containing gas introducing tube and the first heater.

The disclosure also relates to as another aspect a method for producing a Group III nitride crystal, containing steps of:

reacting an oxide or a metal of a Group III element under a heated atmosphere to form a compound gas of the Group III element;

mixing a nitrogen element-containing gas at a temperature that is lower than that of the compound gas, with the compound gas; and reacting the nitrogen element-containing gas with the compound gas to form a Group III nitride crystal.

The method and the apparatus for producing a Group III nitride crystal according to the aspects of the disclosure may suppress the thermal decomposition amount by decreasing the gas temperature, so as to prevent the nitrogen element-containing gas from being short in the gas mixing region on the upstream side of the seed substrate, and as a result, the productivity of a Group III nitride crystal may be enhanced.

DETAILED DESCRIPTION OF PREFERRED EMBODIMENTS

Figure 1:
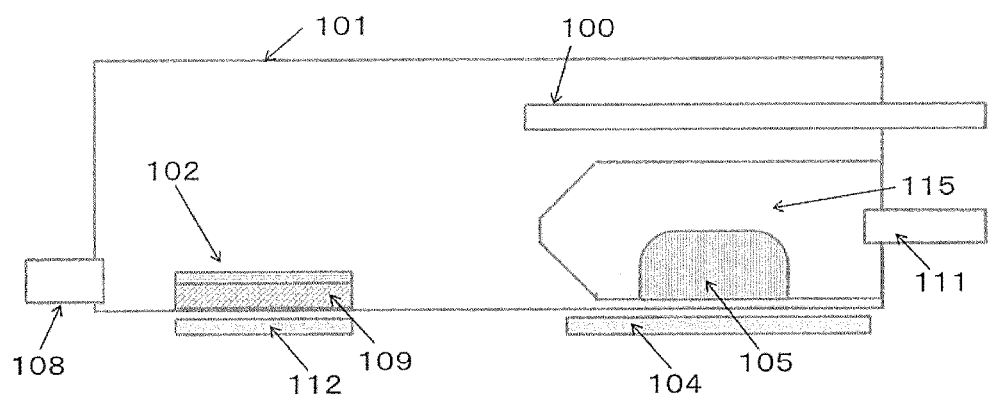
FIG. 1 is a schematic illustration showing an example of a structure of an apparatus for producing a Group III nitride crystal according to an embodiment 1.

An apparatus according to a first aspect of the disclosure is an apparatus for producing a Group III nitride crystal, contains:

a chamber;

a nitrogen element-containing gas introducing tube for introducing a nitrogen element-containing gas to the chamber;

a holder for holding an oxide or a metal of a Group III element;

a first heater for heating the holder;

a reactive gas introducing tube for supplying a reactive gas to the oxide or the metal of the Group III element;

a compound gas supplying port for supplying a compound gas of the Group III element formed through reaction of the reactive gas, to the chamber;

a discharging port for discharging the compound gas and the nitrogen element-containing gas outside the chamber; and a second heater for heating a seed substrate inside the chamber, in which a distance between the holder and the first heater is smaller than a distance between the nitrogen element-containing gas introducing tube and the first heater.

According to a second aspect of the disclosure, in the apparatus for producing a Group III nitride crystal according to the first aspect, the nitrogen element-containing gas introducing tube may be covered with a thermal insulator.

According to a third aspect of the disclosure, in the apparatus for producing a Group III nitride crystal according to the first or second aspect, the apparatus may further contain an inert gas introducing tube between the nitrogen element-containing gas introducing tube and the holder.

A method according to a fourth aspect of the disclosure is a method for producing a Group III nitride crystal, contains steps of:

reacting an oxide or a metal of a Group III element under a heated atmosphere to form a compound gas of the Group III element;

mixing a nitrogen element-containing gas at a temperature that is lower than that of the compound gas, with a reduced product gas of the Group III oxide; and reacting the nitrogen element-containing gas with a reduced product gas of the Group III oxide to form a Group III nitride crystal.

According to a fifth aspect of the disclosure, in the method for producing a Group III nitride crystal according to the fourth aspect, the method may further contain a step of transporting the compound gas and the nitrogen element-containing gas with an inert gas at a temperature that is lower than that of the compound gas and is higher than that of the nitrogen element-containing gas, and then mixing the compound gas and the nitrogen element-containing gas.

According to a sixth aspect of the disclosure, in the method for producing a Group III nitride crystal according to the fourth or fifth aspect, the compound gas and the nitrogen element-containing gas may have a difference in temperature of 150° C. or less.

According to a seventh aspect of the disclosure, in the method for producing a Group III nitride crystal according to any one of the fourth to sixth aspects, the compound gas may be $Ga_2O$, and the nitrogen element-containing gas may be ammonia.

According to an eighth aspect of the disclosure, in the method for producing a Group III nitride crystal according to any one of the fourth to sixth aspects, the compound gas may be formed through reaction of a metal of the Group III element and an oxidizing agent.

The apparatus for producing a Group III nitride crystal and the method for producing a Group III nitride crystal according to the embodiments of the disclosure will be described in detail below with reference to the drawings. In the drawings, members that have substantially the same function may be referred with reference to the same symbol.

Embodiment 1

FIG. 1 is a schematic illustration showing an example of a structure of an apparatus for producing a Group III nitride crystal according to an embodiment 1. In FIG. 1, the sizes and proportions of the constitutional members may be different from the actual ones in some cases. The apparatus for producing a Group III nitride crystal according to the embodiment 1 contains a chamber 101, a nitrogen element-containing gas introducing tube 100 for introducing a nitrogen element-containing gas to the chamber 101, a Group III oxide stage 105 as a holder for holding a Group III oxide, a raw material heater 104 as a first heater for heating the Group III oxide stage 105, a reducing gas introducing tube 111 for supplying a reducing gas to the Group III oxide, a quartz tube 115 that functions as a reduced product gas supplying port for supplying a reduced product gas formed through reduction of the Group III oxide with the reducing gas, to the chamber 101, an exhaust port 108 that functions as a discharging port for discharging the reduced product gas of the Group III oxide and the nitrogen element-containing gas outside the chamber 101, and a substrate heater 112 as a second heater for heating a seed substrate 102 in the chamber 101.

In the apparatus for producing a Group III nitride crystal, the Group III oxide stage 105 is positioned between the nitrogen element-containing gas introducing tube 100 and the raw material heater 104. The nitrogen element-containing gas introducing tube 100 is disposed at a position that is remote from the raw material heater 104, and thus the nitrogen element-containing gas introducing tube 100 may be prevented from being excessively heated. According to the structure, the thermal decomposition amount of the nitrogen element-containing gas may be suppressed by decreasing the temperature thereof, and thus an amount of the nitrogen element-containing gas may be prevented from being insufficient in the gas mixing region on the upstream side of the seed substrate 102. As a result, the productivity of a Group III nitride crystal may be enhanced.

The apparatus for producing a Group III nitride crystal will be described in detail below.

In the apparatus for producing a Group III nitride crystal, the quartz tube 115 that functions as a port for supplying a reduced product gas of the Group III oxide is disposed inside the chamber 101. The right end of the quartz tube 115 is fixed to the chamber 101, to which a reducing gas is supplied through the reducing gas introducing tube 111. The Group III oxide stage 105 is disposed inside the quartz tube 115.

Chamber

Examples of the shape of the chamber 101 include a cylindrical columnar shape, a rectangular columnar shape, a triangular columnar shape, and a shape obtained by combining these shapes. Examples of the material for forming the chamber 101 include quartz, alumina, aluminum titanate, mullite, tungsten and molybdenum.

In this embodiment, the shape of the chamber 101 used is a rectangular columnar shape, and the material thereof is quartz.

In the chamber 101, the seed substrate 102 is placed on a substrate holder (stage) 109. The substrate holder 109 may have a substrate rotation mechanism. The seed substrate 102 may be rotated at a rotation number of from 5 to 100 rpm, and thereby the flatness of the crystal thus formed may be enhanced. The substrate holder 109 is equipped with the substrate heater 112 for heating the seed substrate 102.

Examples of the substrate heater 112 include a resistive heater, such as a ceramic heater and a carbon heater, a high frequency heater, and a light condensing heater. The temperature of the substrate heater 112 is controlled with a processor provided on a circuit board of the substrate heater 112 or with a separate device. The processor or the device stores a program, and a predetermined process is performed by the program.

Group III Oxide Raw Material

The Group III oxide raw material used has a purity of four nines (99.99%), and a shape thereof is not particularly determined and is preferably a shape that has a large area, with which the reducing gas is in contact, for facilitating the reaction. The Group III oxide raw material used herein is $Ga_2O_3$.

Reducing Gas

Examples of the reducing gas used include hydrogen gas, carbon monoxide gas, and a hydrocarbon gas, such as methane gas and ethane gas, hydrogen sulfide gas, and sulfur dioxide gas. Among these, hydrogen gas is preferably used. The gas is preferably heated and then supplied to the quartz tube 115, but the gas may be supplied at ordinary temperature. The flow rate of the gas may be changed depending on the size of the seed substrate 102. The raw material heater 104 is provided under the quartz tube 115, and the reaction shown by the following reaction scheme (III), which is the same as the reaction scheme (I), occurs in the quartz tube 115.

$$Ga_2O_3 + 2H_2 \rightarrow Ga_2O + 2H_2O \tag{III}$$

The reaction requires heating to a temperature of 800° C. or more, and the temperature is preferably 900° C. or more for forming $Ga_2O$ (g) as the reduced product gas in a larger amount.

Raw Material Heater

The raw material heater 104 heats the Group III oxide raw material in the quarts tube 115 and the reducing gas introduced from the reducing gas introducing tube 111. The raw material heater 104 also heats the nitrogen element-containing gas introducing tube 100 disposed at the upper part of the quartz tube 115, but the nitrogen element-containing gas introducing tube 100 is disposed at a position that is remote from the raw material heater 104, and thus the nitrogen element-containing gas heated in the nitrogen element-containing gas introducing tube 100 has a temperature that is lower than that of the reducing gas heated in the quartz tube 115.

Examples of the raw material heater 104 include a ceramic heater, a high frequency heater, a resistive heater and a light condensing heater. The temperature of the raw material heater 104 is controlled with a processor provided on a circuit board of the raw material heater 104 or with a separate device.

Nitrogen Element-Containing Gas

Examples of the nitrogen element-containing gas used include ammonia gas and hydrazine gas. Ammonia gas and hydrazine gas are decomposed at a high temperature to form hydrogen and nitrogen. Among these, ammonia gas is particularly preferred in consideration of the safety, the production cost and the like.

The reduced product gas of the Group III oxide supplied from the quartz tube 115 and the nitrogen element-containing gas supplied from the nitrogen element-containing gas introducing tube 100 are mixed in the chamber 101 and reaches the exhaust port 108 positioned at the left end of the chamber 101 through the principal surface of the seed substrate 102. The mixed gas performs the reaction shown by the following reaction scheme (IV), which is the same as the reaction scheme (II).

$$Ga_2O + 2NH_3 \rightarrow 2GaN + H_2O + 2H_2 \tag{IV}$$

Mechanism in Embodiment 1

In the structure of the aforementioned apparatus, the Group III oxide stage 105 is positioned between the nitrogen element-containing gas introducing tube 100 and the raw material heater 104. Thus, the distance between the Group III oxide stage 105 and the raw material heater 104 is smaller than the distance between the nitrogen element-containing gas introducing tube 100 and the raw material heater 104. According to the structure, the thermal decomposition amount is suppressed to prevent an amount of the nitrogen element-containing gas from being insufficient in the gas mixing region on the upstream side of the seed substrate 102, so as to increase the amount of GaN as the Group III nitride crystal formed on the seed substrate 102, resulting in enhancement of the productivity. The mechanism thereof will be described below.

As for a substance whose crystal undergoing sublimation reaction, the amount of the substance that can be present in the form of gas at a certain temperature (i.e., the saturation amount) is originally given, and the gas exceeding the saturation amount is solidified on a solid matter (e.g., a seed substrate and other members constituting an apparatus) present in the space. At this time, the gas may be solidified as a single crystal on a seed substrate. As for a compound crystal, such as a Group III nitride crystal, it is necessary to mix a reduced product gas of a Group III oxide and a nitrogen element-containing gas. Therefore, for increasing the growing rate of the compound crystal, such as a Group III nitride crystal, for enhancing the productivity thereof, it is necessary to increase both the amounts of the reduced product gas and the nitrogen element-containing gas. For increasing the amount of the reduced product gas, it is necessary to increase the saturation concentration thereof by increasing the temperatures of the Group III oxide raw material gas and the reducing gas.

However, in the case where the temperature of ammonia gas as the nitrogen element-containing gas is increased, there is a problem that thermal decomposition of the ammonia gas starts at 800° C. or more, and the thermal decomposition rate thereof reaches approximately 90% at 1,200° C., which results in a considerable decrease of the amount of the ammonia gas effective for the formation of the Group III nitride.

Accordingly, for increasing the amount of the ammonia gas as the nitrogen element-containing gas, it is necessary to suppress the thermal decomposition amount thereof by decreasing the temperature of the ammonia gas. Based on such knowledge, the present inventors have developed such a structure in this embodiment that no heater is provided on the upper side of the chamber 101, but the nitrogen element-containing gas introducing tube 100 is disposed in the upper part of the quartz tube 115, i.e., the position remote from the raw material heater 104. According to the structure, the temperature of the nitrogen element-containing gas supplied from the nitrogen element-containing gas introducing tube 100 is suppressed from being increased, and consequently the thermal decomposition thereof is suppressed. In this embodiment, the quartz tube 115 for supplying the reduced product gas is disposed above the raw material heater 104, and the nitrogen element-containing gas introducing tube 100 is further disposed above them, thereby making the accumulated structure. According to the structure, the temperature of the nitrogen element-containing gas may be lower than the temperature of the reduced product gas, by which the decomposition amount of the ammonia gas as the nitrogen element-containing gas maybe suppressed even if only a little, and thus the enhancement of the productivity in gas phase growth as the target may be achieved.

In the case where the temperature of the ammonia gas is approximately room temperature for suppressing the thermal decomposition amount thereof, the homogeneity of gas may not be maintained in the gas mixing region and the region on the substrate due to convection caused by the temperature difference between the ammonia gas at room temperature and the reduced product gas heated to 900° C. or more, and thereby the uniformity in thickness, which may be obtained by the uniformity in growing rate, may be impaired to deteriorate the productivity. In the apparatus of this embodiment, the mixing point is at the apical end of the quartz tube 115. In the apical end, the reduced product gas of the Group III oxide and the nitrogen element-containing gas are in contact with each other and mixed. The reduced product gas of the Group III oxide is formed by heating the Group III oxide and the reducing gas to a high temperature. The reaction for forming the reduced product gas proceeds more by increasing the temperature, and the amount of the reduced product gas of the Group III oxide thus supplied is increased and approaches the saturated state. Accordingly, excessive cooling of the reduced product gas in the vicinity of the outlet port of the reduced product gas may cause redeposition of the reduced product gas, and therefore it is necessary to give attention to cooling of the reduced product gas with the nitrogen element-containing gas having a too low temperature in the vicinity of the outlet port of the reduced product gas. In this point of view, this embodiment disposes the nitrogen element-containing gas introducing tube 100 above the quartz tube 115, thereby making the accumulated structure, with which the nitrogen element-containing gas is heated moderately to prevent the difference in temperature between the reduced product gas and the nitrogen element-containing gas from becoming excessive.

In the embodiment 1, the Group III oxide and the reducing gas are heated to 950° C. with the raw material heater 104, and the ammonia gas in the nitrogen element-containing gas introducing tube 100 disposed above them has a temperature less than 950° C. In the apparatus used herein by the inventors, the temperature of the ammonia gas is, for example, approximately 850° C. The temperature of the ammonia gas is sufficient to be less than the temperature of the reduced product gas of the Group III oxide, and the difference in temperature between the ammonia gas and the reduced product gas of tire Group III oxide is preferably 150° C. or less. In the case where the difference in temperature between the gases exceeds 150° C., thermal convection of the gas may occur in the course of progression from the mixing point of the gases to the seed substrate, thereby failing to perform homogeneous gas supply, and thus the uniformity of the thickness of the deposited crystal may be impaired to deteriorate the productivity. The temperature may be controlled with a processor provided on a circuit board of the raw material heater 104 or with a separate device.

The linear distance from the mixing point of the nitrogen element-containing gas supplied from the nitrogen element-containing gas introducing tube 100 and the reduced product gas of the Group III oxide supplied from the quartz tube 115 to the seed substrate 102 is preferably 40 mm or more and 50 mm or less. The inventors have found that the suitable reaction distance and reaction time may be assured in the case where the distance from the mixing point of the reduced product gas of the Group III oxide and the nitrogen element-containing gas to the seed substrate 102 (reaction path length) is 40 mm or more and 50 mm or less. In the case where the reaction path length is less than 40 mm, the reaction may be insufficiently performed due to the fact that the reaction intermediates may be deposited as polycrystals or an amorphous matter on the seed substrate 102. In the case where the reaction path length exceeds 50 mm, the nitrogen element-containing gas may he diffused to decrease the concentration thereof in the mixed gas, and a single crystal may not be formed over the entire surface of the seed substrate 102.

Assuming that the ratio of the current partial pressure of a gas of a certain substance at a certain temperature to the partial pressure where the substance can be present as a gas at the temperature is designated as a supersaturation degree, the supersaturation degree x of the mixed gas in this embodiment at the temperature of the substrate heater 112 preferably satisfies the relationship, $1<x<1.2$. In other words, the temperature obtained by heating with the substrate heater 112 is preferably such a value that achieves the supersaturation degree range, and thereby a crystal with high quality may be grown on the seed substrate 102.

In the apparatus for producing a Group III nitride crystal, the gas flow is preferably formed through suction from the exhaust port 100, and the pressure condition in the chamber 101 is preferably, for example, in a range of from $9.5 \times 10^4$ to $9.9 \times 10^4$ Pa.

Figure 2:
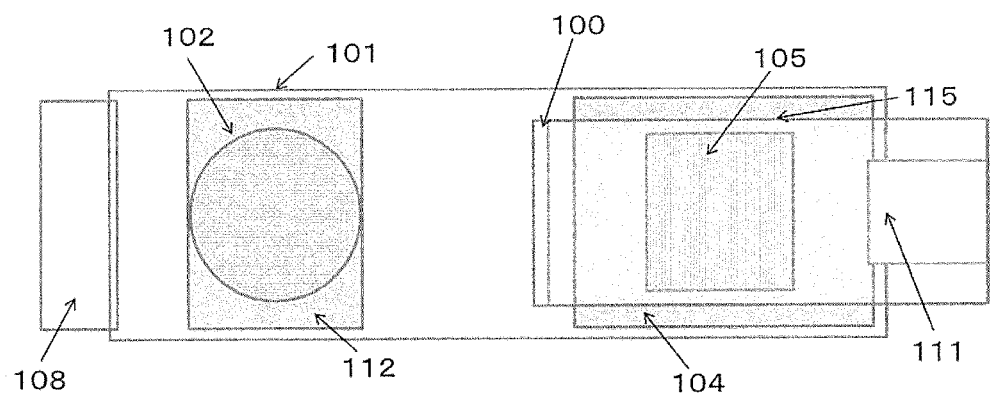
FIG. 2 is a top view showing the apparatus for producing a Group III nitride crystal shown in FIG. 1, in which an upper part of a chamber is cut out.

FIG. 2 is a top view showing the apparatus for producing a Group III nitride crystal of the embodiment 1, in which the upper part of the chamber is cut out. The seed substrate 102 is heated with the substrate heater 112, and the nitrogen element-containing gas introducing tube 100 and the supplying port (apical ends) of the quartz tube 115 supplying the reduced product gas of the Group III oxide are positioned on the upstream side of the seed substrate 102. The widths of the nitrogen element-containing gas introducing tube 100, the quartz tube 115 and the exhaust port 108 may be equivalent to or larger than the diameter of the seed substrate 102.

Modified Embodiment 1

Figure 3:
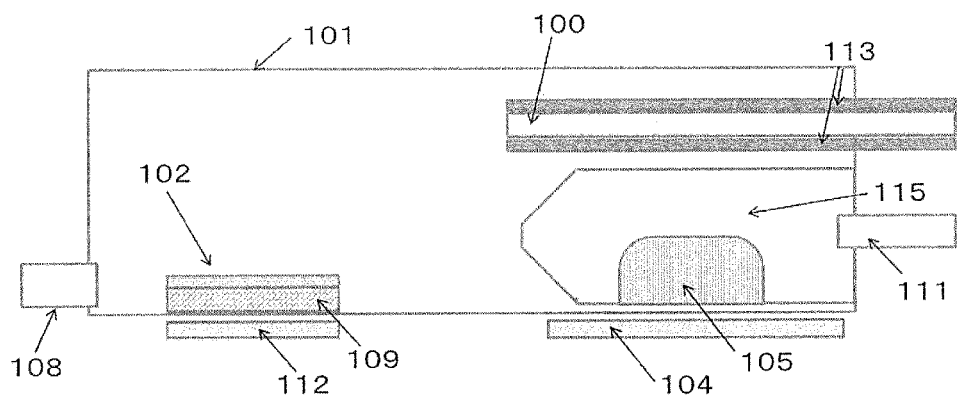
FIG. 3 is a schematic illustration showing an example of a structure of an apparatus for producing a Group III nitride crystal according to a modified embodiment 1.

FIG. 3 is a schematic illustration showing an example of a structure of an apparatus for producing a Group III nitride crystal according to a modified embodiment 1. As shown in FIG. 3, the nitrogen element-containing gas introducing tube 100 may have a thermal insulator 113 that is disposed between the nitrogen element-containing gas introducing tube 100 and the raw material heater 104 or may have a thermal insulator 113 that covers the nitrogen element-containing gas introducing tube 100, for suppressing the heat from the raw material heater 104. According to the structure, overheating of the nitrogen element-containing gas may be prevented from occurring, and the decomposition amount thereof may be suppressed even if only a little.

Modified Embodiment 2

Figure 4:
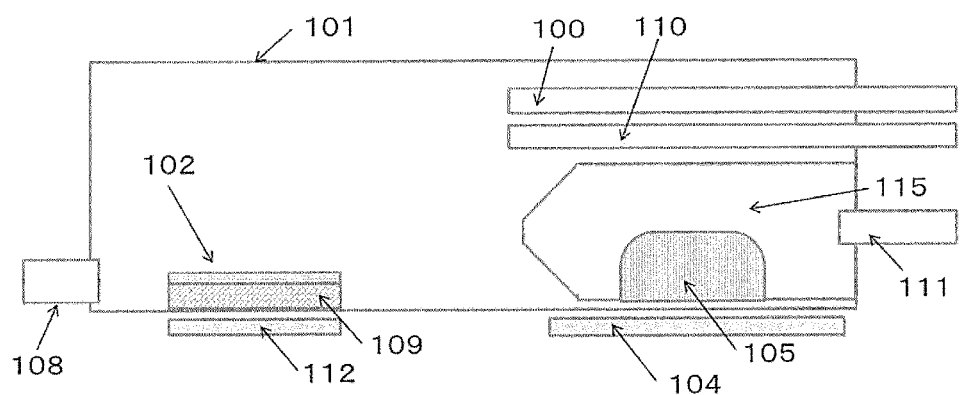
FIG. 4 is a schematic illustration showing an example of a structure of an apparatus for producing a Group III nitride crystal according to a modified embodiment 2.

FIG. 4 is a schematic illustration showing an example of a structure of an apparatus for producing a Group III nitride crystal according to a modified embodiment 2. As shown in FIG. 4, an inert gas introducing tube 110 may be disposed between the nitrogen element-containing gas introducing tube 100 and the raw material heater 104. According to the structure, overheating of the nitrogen element-containing gas may be prevented from occurring, and the decomposition amount thereof may be suppressed even if only a little. Furthermore, the mixing region may be controlled in such a manner that the reduced product gas and the nitrogen element-containing gas are prevented from being in contact with each other in a low temperature region, and thereby the crystal may be grown optimally on the seed substrate 102. In the case of a compound crystal, such as a Group III nitride crystal, in particular, a certain reaction time is necessary after mixing the reduced product gas of the Group III oxide and the nitrogen element-containing gas until the formation of the Group III nitride. In the case where the reduced product gas of the Group III oxide and the nitrogen element-containing gas are in contact with each other in a low temperature region, the reaction may occur insufficiently to form polycrystals or an amorphous matter rather than a single crystal. Accordingly, an inert gas may be introduced to separate the reduced product gas and the nitrogen element-containing gas from each other, so as to shift the mixing region of the gases toward the side of the seed substrate 102 with a higher temperature, and thereby polycrystals may be prevented from being formed. Examples of the inert gas include nitrogen gas, helium gas and argon gas, and nitrogen gas may be optimally used in consideration of the cost and the like. In this embodiment, the inert gas that is introduced from the inert gas introducing tube 110 may have a temperature that is lower than that of the reduced product gas of the Group III oxide (compound gas) and is higher than that of the nitrogen element-containing gas. Thus, the compound gas and the nitrogen element-containing gas may be transported with the inert gas that has a temperature that is lower than the compound gas and higher than the nitrogen element-containing gas, and then the compound gas and the nitrogen element-containing gas may be mixed.

Modified Embodiment 3

Figure 5:
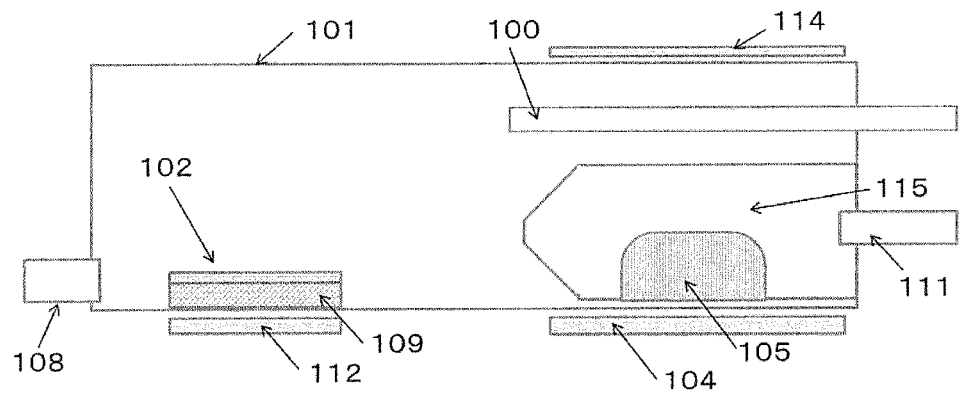
FIG. 5 is a schematic illustration showing an example of a structure of an apparatus for producing a Group III nitride crystal according to a modified embodiment 3.

FIG. 5 is a schematic illustration showing an example of a structure of an apparatus for producing a Group III nitride crystal according to a modified embodiment 3. As shown in FIG. 5, a nitrogen element-containing gas heater 114 may be used for controlling stably the gas temperature inside the nitrogen element-containing gas introducing tube 100 to the optimum temperature. The optimum temperature referred herein is the temperature of the nitrogen element-containing gas that is lower than the temperature of the reduced product gas of the Group III oxide and provides a difference in temperature between the nitrogen element-containing gas and the reduced product gas of the Group III oxide of 150° C. or less as described later. When the difference in temperature between the gases is smaller, the heterogeneity in gas distribution in the gas mixing region due to thermal convection may be suppressed, but the decomposition rate of the nitrogen element-containing gas may be increased in association with the increase of the temperature of the nitrogen element-containing gas. According to the structure, even though the amount of the Group III oxide raw material and the flow rate of the reducing gas are changed, the nitrogen element-containing gas may suffer a smaller change in temperature, and thus the temperature thereof may be stably controlled to the desired value. The stable control of the temperature may be achieved with a processor provided on a circuit board of the nitrogen element-containing gas heater 114 or with a separate device.

In the embodiments shown in FIGS. 1, 3 and 5, the height from the seed substrate 102 to the top of the chamber 101, i.e., the height of the crystal growing space, is preferably in a range of 30 mm or more and 60 mm or less. In the case where the height of the crystal growing space is less than 30 mm, the formation of polycrystals may be accelerated due to the too narrow space for transporting the gases. In the case where the height of the crystal growing space exceeds 60 mm, on the other hand, the nitrogen element-containing gas may diffuse to make difficult the maintenance of the nitrogen concentration on the seed substrate 102. Accordingly, the height of the crystal growing space is preferably in a range of 30 mm or more and 60 mm or less.

In the case where other Group III oxides than $Ga_2O_3$, the apparatus for producing a Group III nitride crystal may be used for producing a Group III nitride crystal in the similar manner as the formation of a GaN crystal using $Ga_2O_3$. Examples of the other Group III oxides than $Ga_2O_3$ include $In_2O_3$ for the case where the Group III element is In (indium), $Al_2O_3$ for the case where the Group III element is Al (aluminum), $B_2O_3$ for the case where the Group III element is B (boron, and $Tl_2O_5$ for the case where the Group III element is Tl (thallium).

The Group III oxides, such as $Ga_2O_3$, are materials that are stable in the air, and may be advantageously handled easily. Alternatively, a metal of a Group III element, such as Ga, may be prepared instead of an oxide of a Group III element, such as $Ga_2O_3$, and the Group III metal may be oxidized with by supplying an oxidizing gas thereto under a heated atmosphere, so as to form $Ga_2O$ or the like as the compound gas of the Group III element. Some species of the Group III metals, such as Ga, are generally available in the form of a high purity material at lower cost than the Group III oxides. The Group III metal, such as Ga, also has such advantages that the metal is in the form of a liquid at a low temperature and thus facilitates the use of a mechanism for continuously supplying the material, and the metal forms no $H_2O$ on forming the oxide gas and thus suppresses the quality of the Group III nitride crystal from being deteriorated.

Accordingly, the Group III oxide stage 105 functions as a holder for holding an oxide or a metal of a Group III element. The reducing gas introducing tube 111 functions as a reactive gas introducing tube for supplying a reactive gas to the oxide or the metal of the Group III element. The reactive gas for an oxide of a Group III element is a reducing gas, whereas the reactive gas for a metal of a Group III element is an oxidant, such as $H_2O$ gas, $O_2$ gas, $CO_2$ gas and CO gas. The quartz tube 115 functions as a compound gas supplying port for supplying a compound gas of a Group III element formed through reaction of the reactive gas, to the chamber 101. The exhaust port 108 functions as a discharging port for discharging the compound gas and the nitrogen element-containing gas outside the chamber 101.

The method for producing a Group III nitride crystal according another aspect of the embodiment contains a step of reacting an oxide or a metal of a Group III element under a heated atmosphere to form a compound gas of the Group III element. In the case where the Group III element is Ga, the oxide is $Ga_2O_3$, and the metal is Ga. The compound gas formed is $Ga_2O$ (i.e., an oxide gas of a Group III element) in both the cases where the source material is an oxide and a metal. The method also contains a step of mixing a nitrogen element-containing gas at a temperature that is lower than that of the compound gas, with the compound gas. The method further contains a step of reacting the nitrogen element-containing gas with the compound gas to form a Group III nitride crystal. According to the process steps, the productivity may be enhanced.

The embodiment will be described in more detail below with reference to examples of the embodiments and the modified embodiments, and comparative examples for the comparison with the examples.

EXAMPLE 1

An apparatus for producing a Group III nitride crystal in Example 1 was the same as the apparatus for producing a Group III nitride crystal in the embodiment 1 as shown in FIG. 1. In Example 1, the heating temperature by the substrate heater was 1,200° C., the heating temperature of the Group III oxide stage by the raw material heater was 950° C., hydrogen was supplied as a reducing gas at a rate of 10 L/min, $Ga_2O$ was supplied as a raw material gas at a rate of 0.5 L/min, ammonia was supplied as a nitrogen element-containing gas at a rate of 5 L/min, and the seed substrate 102 was rotated at a rotation number of 10 rpm. The nitrogen element-containing gas introducing tube was disposed above the quartz tube for supplying the raw material gas, the opening areas of the supplying ports were controlled to make the flow velocities of the gases equivalent to each other. Specifically, the height of the outlet of the quartz tube for introducing the raw material gas was 6 mm, and the height of the outlet of the nitrogen element-containing gas introducing tube for introducing the nitrogen element-containing gas was 3 mm. The mixing point of the reduced product gas of the Group III oxide and the nitrogen element-containing gas was disposed at a position with a height of 15 mm on the upstream side of the seed substrate. Such a structure was used that the reduced product gas of the Group III oxide and the nitrogen element-containing gas were blown horizontally. The height of the crystal growing space was 45 mm.

EXAMPLE 2

In Example 2, the same conditions as in Example 1 were used except that the nitrogen element-containing gas introducing tube was covered with a thermal insulator to prevent overheating from occurring due to the raw material heater, as similar to the modified example 1 (FIG. 3).

EXAMPLE 3

In Example 3, the same conditions as in Example 1 were used except that an inert gas introducing tube was disposed between the nitrogen element-containing gas introducing tube and the quartz tube to prevent overheating from occurring due to the raw material heater, and argon gas was supplied as an inert gas at a rate of 2 L/min to provide a mixing region, by which the reduced product gas and the nitrogen element-containing gas were prevented from being in contact with each other in a low temperature region, as similar to the modified example 2 (FIG. 4).

EXAMPLE 4

In Example 4, the same conditions as in Example 1 were used except that a nitrogen element-containing gas heater was used for controlling the gas temperature inside the nitrogen element-containing gas introducing tube, and the temperature of the nitrogen element-containing gas was controlled to 850° C., as similar to the modified example 3 (FIG. 5).

COMPARATIVE EXAMPLE 1

In Comparative Example 1, the same conditions as in Example 4 were used except that the temperature of the nitrogen element-containing gas was controlled to 700° C.

COMPARATIVE EXAMPLE 2

In Comparative Example 2, the same conditions as in Example 4 were used except that the temperature of the nitrogen element-containing gas was controlled to 950° C.

The temperature of ammonia gas as the nitrogen element-containing gas was evaluated for the case where the temperatures of the Group III oxide and the reducing gas were controlled to 950° C. under the conditions of Examples and Comparative Examples. The decomposition rate of the ammonia gas was obtained by measuring the concentration of the ammonia gas in the vicinity of the exhaust port, and calculating the decomposition rate from the ammonia gas concentration ratio in the case where the gas temperature was room temperature. The uniformity in thickness of the crystal film was evaluated by the dispersion of the measured values at five points on the plane of the crystal film. A smaller value of the uniformity in thickness of the crystal film means a smaller dispersion thereof and better uniformity in thickness. The thickness of the film was measured at plural points with a scanning electron microscope (SEM), and the uniformity was evaluated according to the following expression.

uniformity=((maximum thickness)−(minimum thickness))/(2×(average thickness))

For suppressing the decomposition rate of ammonia, the temperature of the ammonia gas was preferably low, and was necessarily controlled to 850° C. or less for suppressing the decomposition rate to 10% or less. It was determined that the difference in temperature of the gases was necessarily 150° C. or less for providing good uniformity in thickness of the crystal film (the uniformity in thickness of the crystal film of 10% or less). The results are shown in Table 1 below. As shown in Table 1, it was confirmed that in all Examples, the decomposition rate of the ammonia gas was suppressed to 10% or less, and the uniformity in thickness of the crystal film was suppressed to 10% or less, thereby enhancing the productivity in the gas phase growth method.

TABLE 1

| Conditions | Temperature of ammonia gas | Decomposition rate of ammonia gas | Difference in Temperature of gases | Uniformity in thickness of crystal film |
|---|---|---|---|---|
| Example 1 | 850° C. | 10% | 100° C. | 5% |
| Example 2 | 800° C. | 5% | 150° C. | 10% |
| Example 3 | 800° C. | 5% | 150° C. | 10% |
| Example 4 | 850° C. | 10% | 100° C. | 5% |
| Comparative Example 1 | 700° C. | 1% | 250° C. | 50% |
| Comparative Example 2 | 950° C. | 40% | 0° C. | 10% |

INDUSTRIAL APPLICABILITY

As described in the foregoing, a Group III nitride crystal capable of being applied to, for example, a power semiconductor, a heterojunction high energy electron device, and a photoelectronic device, such as an LED and a field of laser may be obtained according to the embodiments.

What is claimed is:
1. A method for producing a Group III nitride crystal, comprising:
  reacting an oxide or a metal of a Group III element under a heated atmosphere to form a compound gas of the Group III element in a supplying port heated by a first heater at an upstream side of a flow path;
  mixing the compound gas with a nitrogen element-containing gas introduced by a first introducing tube heated by the first heater; and
  reacting the nitrogen element-containing gas with the compound gas to form a Group III nitride crystal on a seed substrate heated by a second heater at a downstream side of the flow path from the first heater;
  wherein the first introducing tube is disposed outside the supplying port, and
  the nitrogen element-containing gas at the upstream side is heated to a temperature lower than a temperature of the heated atmosphere by not providing the first heater at a position across the first introducing tube from the supplying port.
2. The method for producing a Group III nitride crystal according to claim 1, wherein the method further comprises:
  transporting the compound gas and the nitrogen element-containing gas with an inert gas introduced by a second introducing tube and then mixing the compound gas and the nitrogen element-containing gas,
  wherein the second introducing tube is set between the first introducing tube and the supplying port to control a temperature of the inert gas to be lower than the temperature of the heated atmosphere and higher than the temperature of the nitrogen element-containing gas.

3. The method for producing a Group III nitride crystal according to claim 1, wherein the compound gas and the nitrogen element-containing gas have a difference in temperature no greater than 150° C.

4. The method for producing a Group III nitride crystal according to claim 1, wherein the compound gas is $Ga_2O$, and the nitrogen element-containing gas is ammonia.

5. The method for producing a Group III nitride crystal according to claim 1, wherein the compound gas is formed through reaction of a metal of the Group III element and an oxidizing agent.

6. The method for producing a Group III nitride crystal according to claim 1, wherein the first introducing tube is provided at a position remote from the first heater.

7. A method for producing a Group III nitride crystal, comprising:
   reacting an oxide or a metal of a Group III element under a heated atmosphere to form a compound gas of the Group III element in a supplying port heated by a first heater at a upstream side of a flow path;
   mixing the compound gas with a nitrogen element-containing gas introduced by a first introducing tube heated by the first heater; and
   reacting the nitrogen element-containing gas with the compound gas to form a Group III nitride crystal on a seed substrate heated by a second heater at a downstream side of the flow path from the first heater;
   wherein the first heater includes a nitrogen element-containing gas heater and a raw material heater,
   the nitrogen element-containing gas heater is provided at a position across the first introducing tube from the supplying port,
   the raw material heater is provided at a position across the supplying port from the first introducing tube, and
   the nitrogen element-containing gas at the upstream side is heated to a temperature lower than a temperature of the heated atmosphere by controlling the nitrogen element-containing gas heater and the raw material heater separately.

8. The method for producing a Group III nitride crystal according to claim 7, wherein the method further comprises:
   transporting the compound gas and the nitrogen element-containing gas with an inert gas introduced by a second introducing tube and then mixing the compound gas with the nitrogen element-containing gas,
   wherein the second introducing tube is set between the first introducing tube and the supplying port to control a temperature of the inert gas to be lower than the temperature of the heated atmosphere and higher than the temperature of the nitrogen element-containing gas.

9. The method for producing a Group III nitride crystal according to claim 7, wherein the compound gas and the nitrogen element-containing gas have a difference in temperature no greater than $15020$ C.

10. The method for producing a Group III nitride crystal according to claim 7, wherein the compound gas is $Ga_2O$, and the nitrogen element-containing gas is ammonia.

11. The method for producing a Group III nitride crystal according to claim 7, wherein the compound gas is formed through reaction of a metal of the Group III element and an oxidizing agent.

* * * * *